United States Patent
Chumley et al.

(10) Patent No.: US 6,964,444 B2
(45) Date of Patent: Nov. 15, 2005

(54) APPARATUS AND METHOD FOR ACCESSING AND EXTENDING A TRUCK BED

(75) Inventors: William M. Chumley, 3303 Green Pond Rd., Woodruff, SC (US) 29388; Kenneth D. Chumley, Woodruff, SC (US)

(73) Assignee: William M. Chumley, Woodruff, SC (US)

( * ) Notice: Subject to any disclaimer, the term of this patent is extended or adjusted under 35 U.S.C. 154(b) by 49 days.

(21) Appl. No.: 10/852,301

(22) Filed: May 24, 2004

(65) Prior Publication Data

US 2005/0006921 A1 Jan. 13, 2005

Related U.S. Application Data

(63) Continuation of application No. 10/379,040, filed on Mar. 5, 2003, now Pat. No. 6,739,639.

(51) Int. Cl.[7] .................................................. B60P 3/34
(52) U.S. Cl. ...................... 296/26.08; 296/61; 296/62; 296/26.11; 280/166
(58) Field of Search ........................... 296/26.08, 57.1, 296/39.2, 3, 37.6, 61, 26.11, 62, 51; 414/537; 224/403, 405, 402, 404, 510; 14/71.1; 280/164.1; 410/129, 143

(56) References Cited

U.S. PATENT DOCUMENTS

| 3,462,170 | A | * | 8/1969 | Smith et al. | 280/166 |
| 3,853,369 | A | * | 12/1974 | Holden | 296/62 |
| 3,997,211 | A | * | 12/1976 | Graves | 296/162 |
| 4,021,071 | A | * | 5/1977 | Norman | 296/62 |
| 4,191,388 | A | * | 3/1980 | Barksdale | 296/62 |
| 4,194,754 | A | * | 3/1980 | Hightower | 280/166 |
| 4,527,941 | A | * | 7/1985 | Archer | 296/61 |
| 4,795,304 | A | * | 1/1989 | Dudley | 296/61 |
| 4,846,487 | A | * | 7/1989 | Criley | 296/62 |
| 4,848,821 | A | * | 7/1989 | Llewellyn | 296/62 |

(Continued)

Primary Examiner—Kiran B. Patel
(74) Attorney, Agent, or Firm—Dority & Manning, P.A.

(57) ABSTRACT

Apparatus and method are illustrated for accessing, extending and exiting a truck bed and having a pair of opposed end frame members (A) carried on opposed respective sides of the truck preferably on a truck having a tailgate. A transverse member (B) is substantially U-shaped and constructed of tubular frame members and carried in such a way that the legs (C) are pivotally carried between the upright frame members. A releasable fastening member (D) is provided for positioning the transverse member in upright position while stop member (E) limits downward pivotal movement of transverse member.

20 Claims, 7 Drawing Sheets

OTHER PUBLICATIONS

| | | | |
|---|---|---|---|
| 5,028,063 A | * | 7/1991 | Andrews ............... 296/62 |
| 5,197,642 A | * | 3/1993 | Cortelli ............... 224/403 |
| 5,205,603 A | * | 4/1993 | Burdette, Jr. ........... 296/62 |
| 5,211,437 A | * | 5/1993 | Gerulf ................ 296/61 |
| 5,215,376 A | * | 6/1993 | Schulte et al. ......... 366/348 |
| 5,312,150 A | * | 5/1994 | Quam ................ 296/62 |
| 5,549,312 A | * | 8/1996 | Garvert .............. 296/62 |
| 5,597,195 A | | 1/1997 | Meek |
| 5,617,930 A | * | 4/1997 | Elia ................. 296/62 |
| 5,658,033 A | * | 8/1997 | Delaune ............ 296/26.08 |
| 5,687,813 A | * | 11/1997 | Bensch ............. 280/166 |
| 5,732,996 A | * | 3/1998 | Graffy et al. .......... 296/62 |
| 5,788,311 A | * | 8/1998 | Tibbals .............. 296/62 |
| 5,816,638 A | * | 10/1998 | Pool, III ........... 296/26.11 |
| 5,941,342 A | * | 8/1999 | Lee ................. 182/95 |
| 6,193,294 B1 | | 2/2001 | Disner et al. |
| 6,227,593 B1 | * | 5/2001 | De Valcourt ........ 296/26.08 |
| 6,270,139 B1 | * | 8/2001 | Simpson ............. 296/62 |
| 6,283,525 B1 | | 9/2001 | Morse |
| 6,340,190 B1 | * | 1/2002 | Rosebrugh et al. .... 296/26.11 |
| 6,364,391 B1 | * | 4/2002 | Everett .............. 296/51 |
| 6,364,392 B1 | * | 4/2002 | Meinke .............. 296/62 |
| 6,367,858 B1 | | 4/2002 | Bradford |
| 6,422,342 B1 | * | 7/2002 | Armstrong et al. ...... 296/62 |
| 6,422,630 B1 | | 7/2002 | Heaviside |
| 6,435,588 B1 | | 8/2002 | Bauer |
| 6,454,338 B1 | * | 9/2002 | Glickman et al. ..... 296/57.1 |
| 6,499,564 B2 | * | 12/2002 | Puglisi .............. 280/163 |
| 6,513,850 B1 | * | 2/2003 | Reed .............. 296/26.08 |
| 6,550,841 B1 | * | 4/2003 | Burdon et al. ....... 296/57.1 |
| 6,742,822 B2 | * | 6/2004 | Vejnar ............. 296/26.11 |
| 6,764,123 B1 | * | 7/2004 | Bilyard .............. 296/61 |
| 6,824,186 B2 | * | 11/2004 | Brown ............. 296/65.16 |
| 2002/0070577 A1 | | 6/2002 | Pool et al. |
| 2002/0121794 A1 | | 9/2002 | Vejnar |
| 2002/0164225 A1 | | 11/2002 | Snyder et al. |
| 2002/0189903 A1 | | 12/2002 | Krish |
| 2003/0188925 A1 | | 10/2003 | Korpi |
| 2003/0188926 A1 | * | 10/2003 | Crain ............... 182/166 |
| 2005/0006921 A1 | * | 1/2005 | Chumley et al. ....... 296/75 |

* cited by examiner

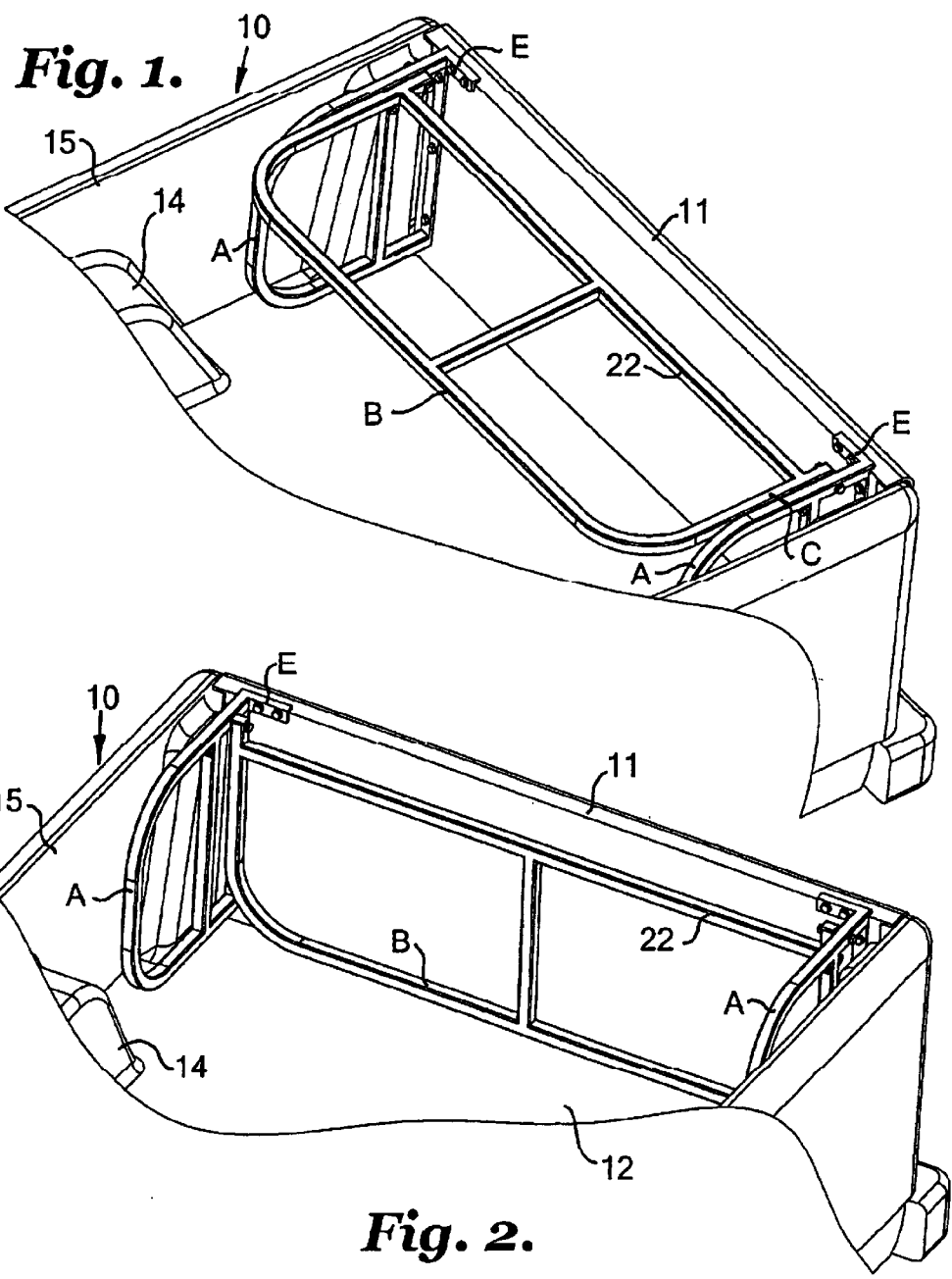

US 6,964,444 B2

APPARATUS AND METHOD FOR ACCESSING AND EXTENDING A TRUCK BED

The present application is a continuation of U.S. application Ser. No. 10/379,040 filed Mar. 5, 2003 and now issued as U.S. Pat. No. 6,739,639.

BACKGROUND OF THE INVENTION

This invention relates to an apparatus and method for use on pick up trucks and the like as original equipment or to be retrofitted for use on existing trucks for accessing and for extending the truck bed and to secure various objects, i.e., pipe, lumber, ladders, gas cans, etc., as well as for supporting the feet and lower legs of the user for comfort in sitting on a tailgate.

Many efforts have been made to solve the problem of providing convenient access to the bed of pick up trucks and the like. The following United States Patents are illustrative of the prior art: U.S. Pat. Nos. 6,435,588, 6,422,630, 6,367,858, 6,193,294, 5,658,033. The various constructions illustrated in the patents are relatively expensive and complicated. None provide a simple practical solution to the problem of accessing a tailgate and for sitting thereon as for tailgate parties in such a way as to add to the comfort and well being of the user. Furthermore, none of the prior art patents show the use of a frame like device which serves to extend the bed of the truck and provide ready access to the tailgate by the user.

Various prior art constructions involve downwardly extending framework extending across the tailgate serving as a step for accessing the truck bed as well as to effectively extend truck bed for increased capacity and usefulness.

Additional prior art includes a U-shaped tubular frame extending downwardly and slightly rearwardly providing a foldable transverse step above the ground and carried at free ends to one side of the tailgate. These folding tailgate steps are sold under the trademark Bed-Hopper by J C Whitney of J C Whitney Way LaSalle, Ill. 61301.

SUMMARY OF THE INVENTION

Accordingly it is an important object of this invention to provide a pivoted frame attached to a vehicle such as a pick up truck for downward pivotal movement against a stop member positioning a step rearwardly above the ground pivotally carried by free ends of frame members at each side of the bed of the truck for accessing the bed of the pick up truck.

An important object of this invention is to provide a simplified method for accessing the bed of a pickup truck to ascend and descend while positioning the feet of a user seated on a tailgate without leaving the legs of the user in a dangling position.

An important object of this invention is to provide an extended bed pickup truck with simplified frame construction which may be lowered to a rear inclined position above the ground to provide a step for accessing the vehicle while enlarging the capacity of the bed of a pickup truck.

A method and apparatus that is inexpensive and of simple construction is operable to provide a convenient device for accessing a pickup flat bed and for extending the bed includes a pivotal frame connected between upright end frame members on opposite sides of the tailgate. The frame is pivoted at lower ends for downward movement to a position for receiving the foot of the user for stepping onto the bed while accessing and serving as an apparatus useful for extending and accommodating contents on a flatbed. The upright end frame members serve as handles to aid the user in sitting upon a tailgate comfortably with the feet and lower legs extending rearwardly at an angle of about 60° to the horizontal.

BRIEF DESCRIPTION OF THE DRAWINGS

The construction designed to carry out the invention will be hereinafter described, together with the other features thereof.

The invention will be more readily understood from reading of the following specification and by reference to the accompanying drawings forming a part thereof, wherein as example of the invention is shown and wherein:

FIG. 1 is a perspective view of an embodiment of the present invention with the transverse member in a first position;

FIG. 2 is a perspective view of the embodiment shown in FIG. 1 with the transverse member in a folded position within a pick up truck;

DESCRIPTION OF A PREFERRED EMBODIMENT

Figure 3:
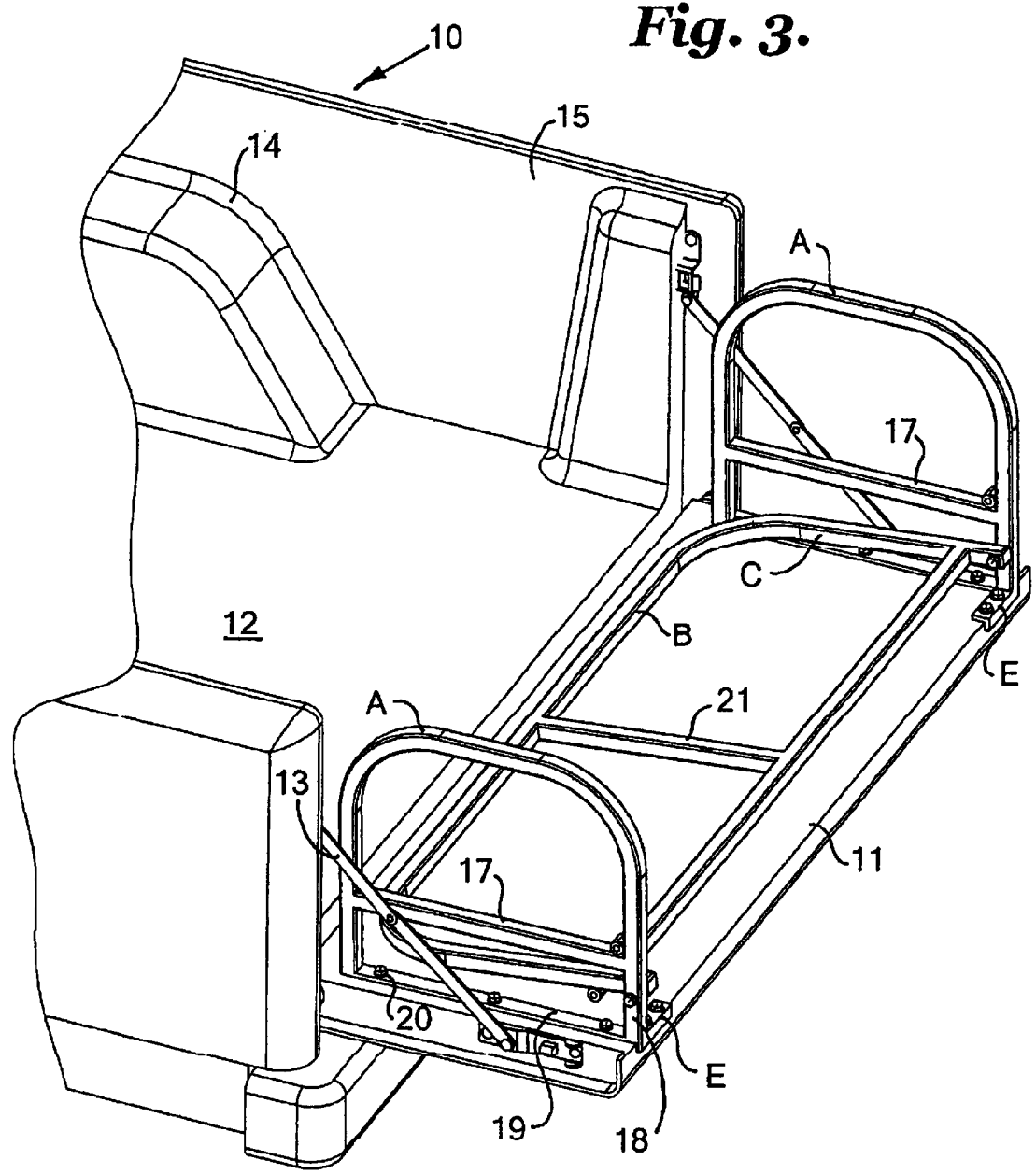
FIG. 3 is a perspective view of the embodiment shown in FIG. 2 with the transverse member in a folded position with the tailgate down.
Figure 4:
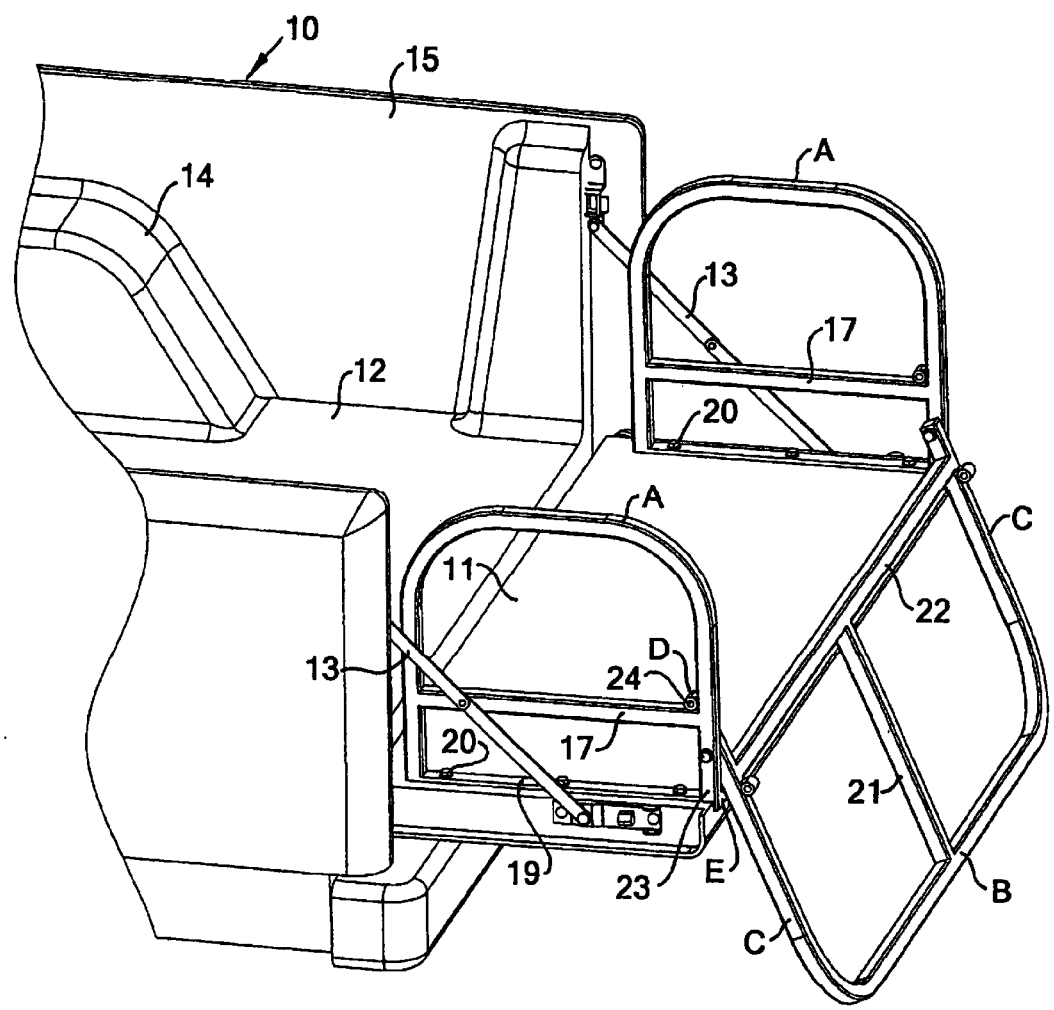
FIG. 4 is a perspective view of the embodiment shown in FIG. 3 with the transverse member in a second position.

The drawings illustrate an apparatus and method for accessing and extending a truck bed 12 having a tailgate 11 wherein a pair of opposed end frame members A are carried adjacent respective opposite sides of the tailgate 11. A transverse member B is constructed of a substantially U-shaped tubular frame member wherein the legs C of the U-shaped member act as end members for the transverse member B and are pivotally carried adjacent free ends between the end frame members A adjacent a rear edge of the tailgate 11. A releasable fastening member D fixes the transverse member B in upright position on the tailgate 11. A stop member E limits downward pivotal movement of the transverse member B when the fastening member D is released for downward pivotal movement to an angular depending position extending rearwardly above the ground by an amount generally corresponding to a stair riser to receive a foot of the user when ascending onto the tailgate 11.

Thus, the end frame members A serve as load retaining members and as handles to aid in accessing the truck 10. The transverse member B when in an upright position serves as a load retaining member and when in a depending position as a foot receiving member to aid in accessing the truck bed 12 and for supporting the feet and lower legs of the user for comfort in a seated position on the tailgate 11 of the truck 10.

The drawings illustrate a pick up truck broadly designated at 10 having a tailgate 11 hinged to the bed 12 of the pick up 10. A folding hinge 13 supports the tailgate 11 in a lowered horizontal position. The pick up truck 10 has wheel wells 14 carried between respective sides 15 of the pick up truck 10. Opposed end frame members A are constructed of U-shaped tubular members that carry a base member 17 adjacent to lower free ends. The free ends of the end frame members A are secured as by brackets 18 mounted on side frame members 19 fastened as by screws 20 to the sides of the tailgate 11.

The transverse member B extends substantially from one side to the other across the tailgate 11 and is also illustrated as being of tubular construction. A center support of tubular construction is illustrated at 21 whereas a support member 22 is transversely carried between a lower portion of the legs C. The legs C are pivotally mounted adjacent to spaced brackets as at 23. A releasable fastening member D is illustrated in the form of sleeve having a bore 24 extending from one end to the other to accommodate a pin 25 illustrated in FIG. 5 that is provided with a head on one end and cotter pin 26 for retention within the transverse bore 24 and within a complimentary member on the legs C.

A stop member E attaches to the bracket 18 and may be of an angular configuration extending inwardly of each side along the rear edge of the tailgate 11.

Figure 5:
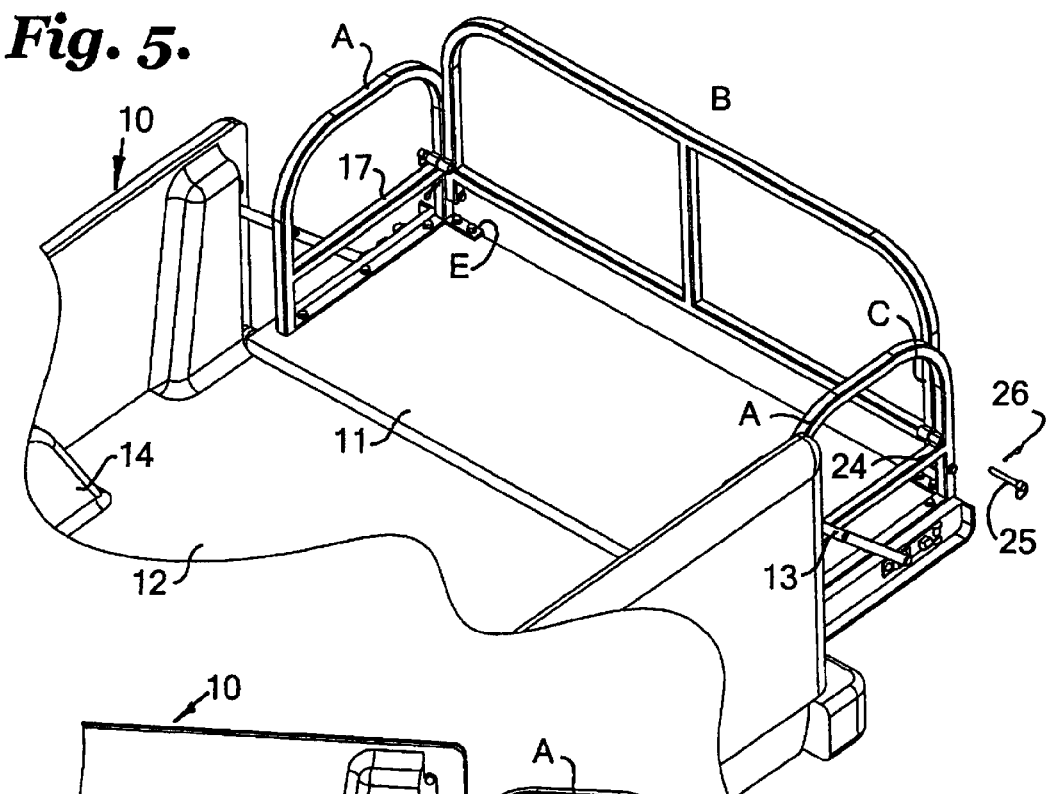
FIG. 5 is a perspective view of the embodiment shown in FIG. 1 with the tailgate down.
Figure 6:
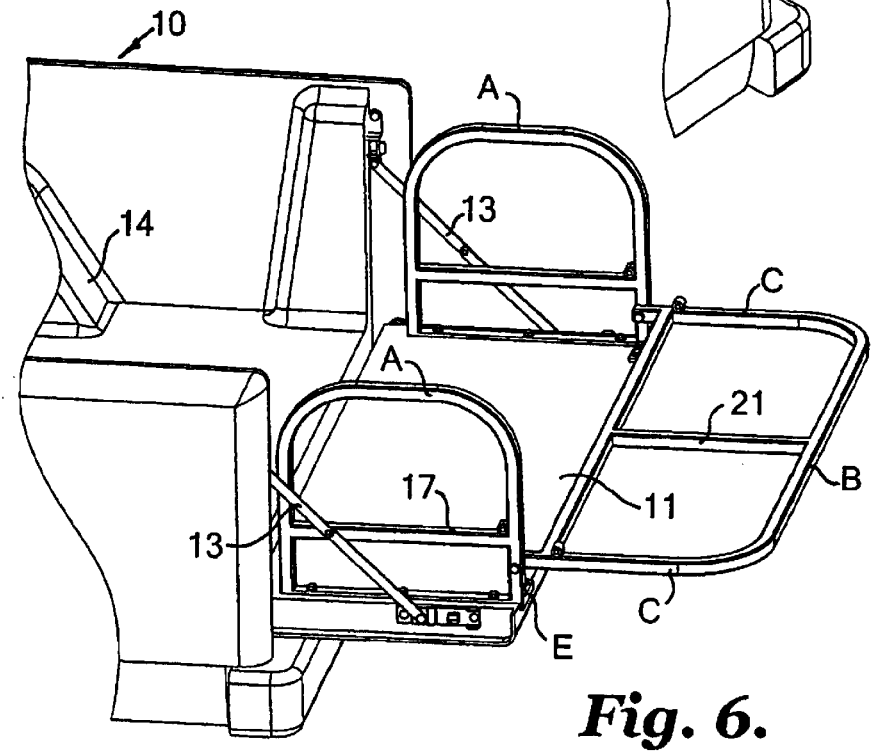
FIG. 6 is a perspective view of the embodiment shown in FIG. 5 with the transverse member in a third position.

The end frame members A also serve as load retaining members and are especially useful as handles to aid a user when accessing the bed 12 of the pick up truck 10. The transverse member B, when in an upright position as illustrated in FIG. 5, serves as confinement members to extend the bed 12 of the truck 10 and to retain articles in position for transport upon the bed 12.

Figure 7:
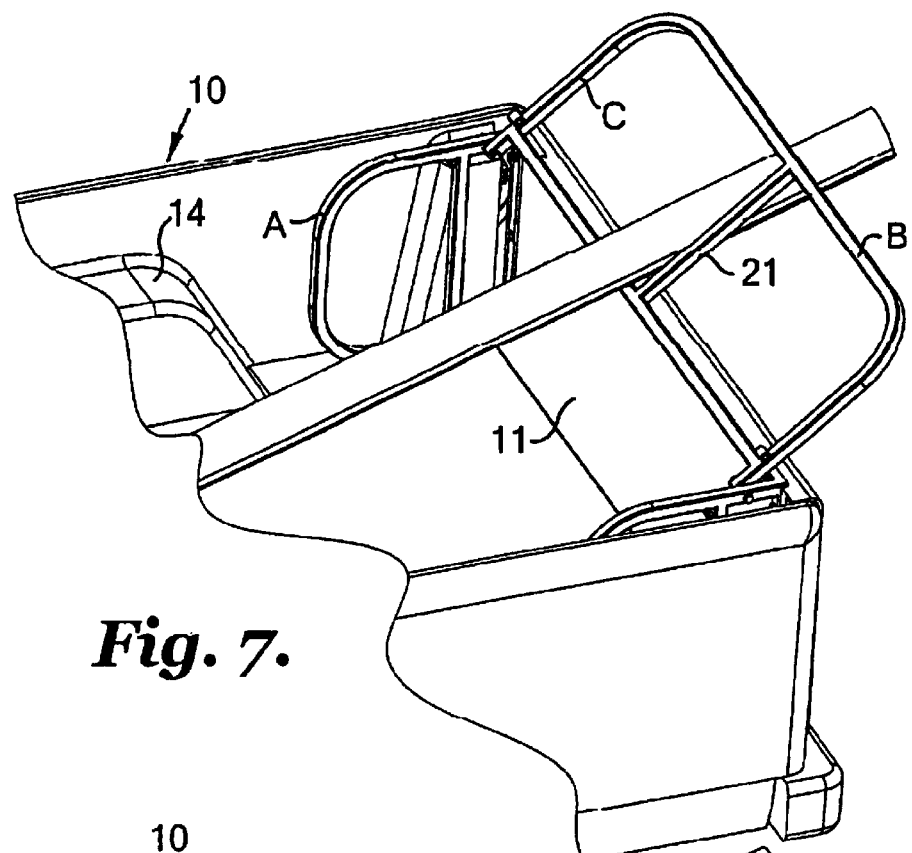
FIG. 7 is a perspective view of the embodiment shown in FIG. 4 with the tailgate up.
Figure 8:
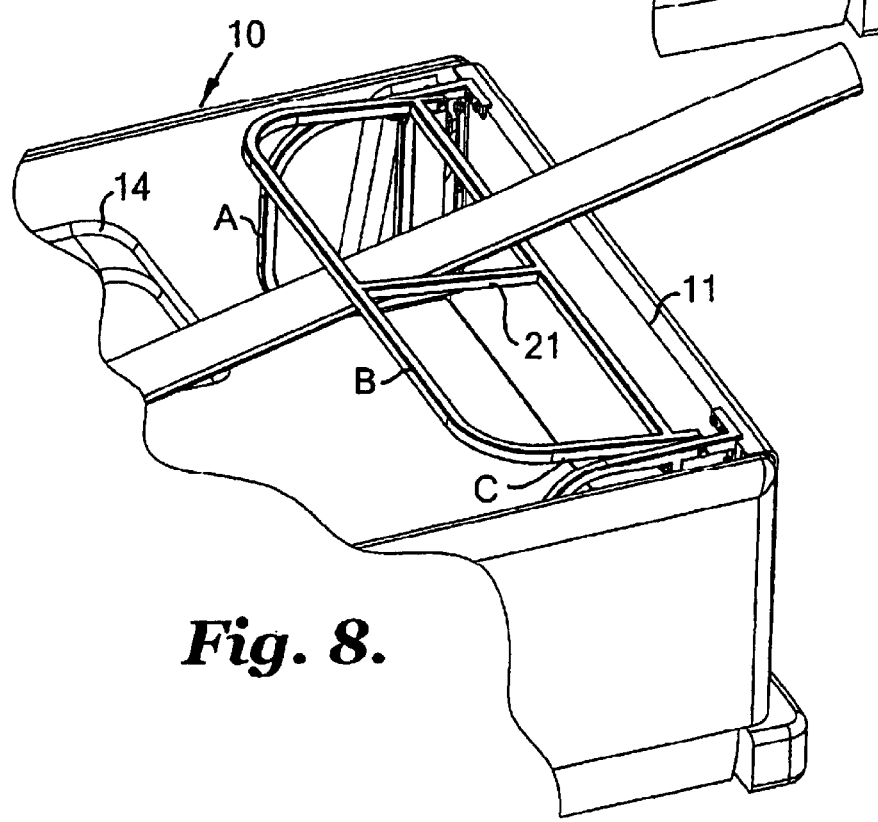
FIG. 8 is a perspective view of the embodiment shown in FIG. 1.
Figure 10:
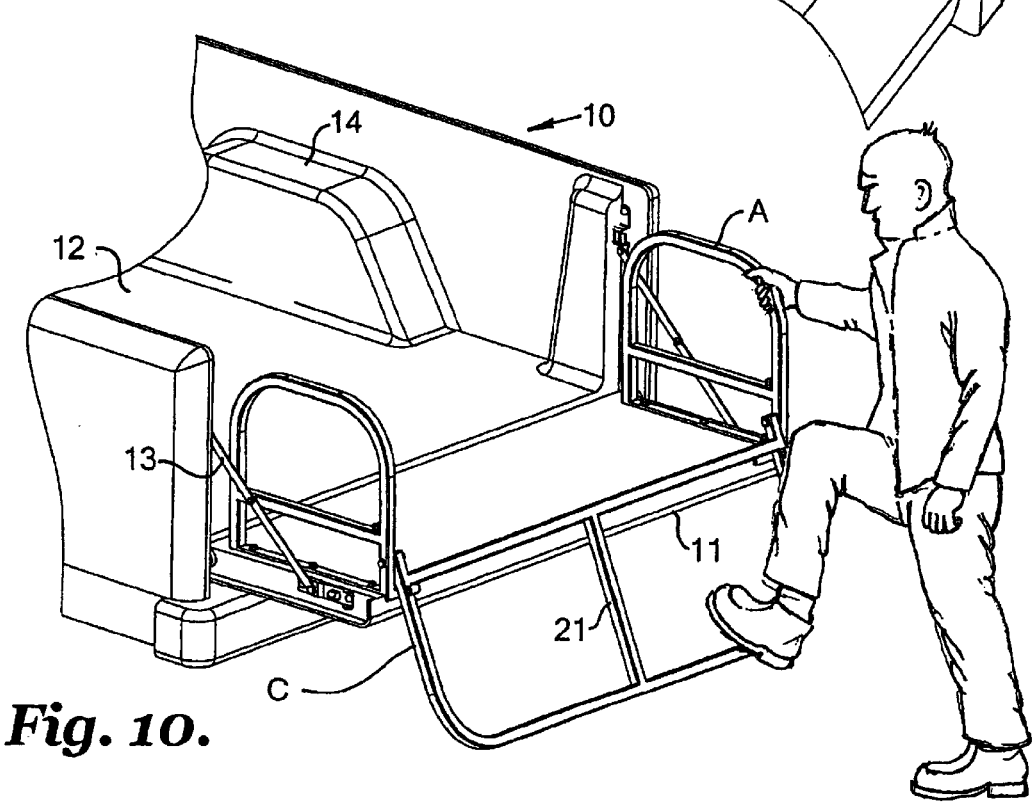
FIG. 10 is a perspective view of the embodiment shown in FIG. 4 illustrating the use of the transverse member in the second position for accessing the truck bed as a step member.
Figure 11:
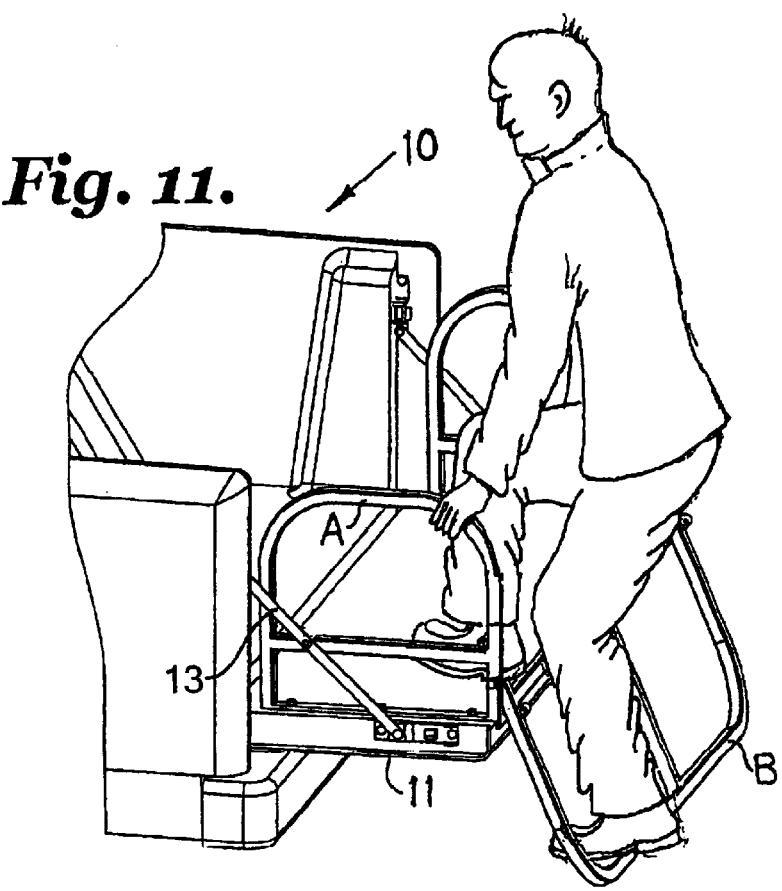
FIG. 11 is a perspective view of the embodiment shown in FIG. 4 illustrating the use of the transverse member for descending from the bed of a truck.
Figure 12:
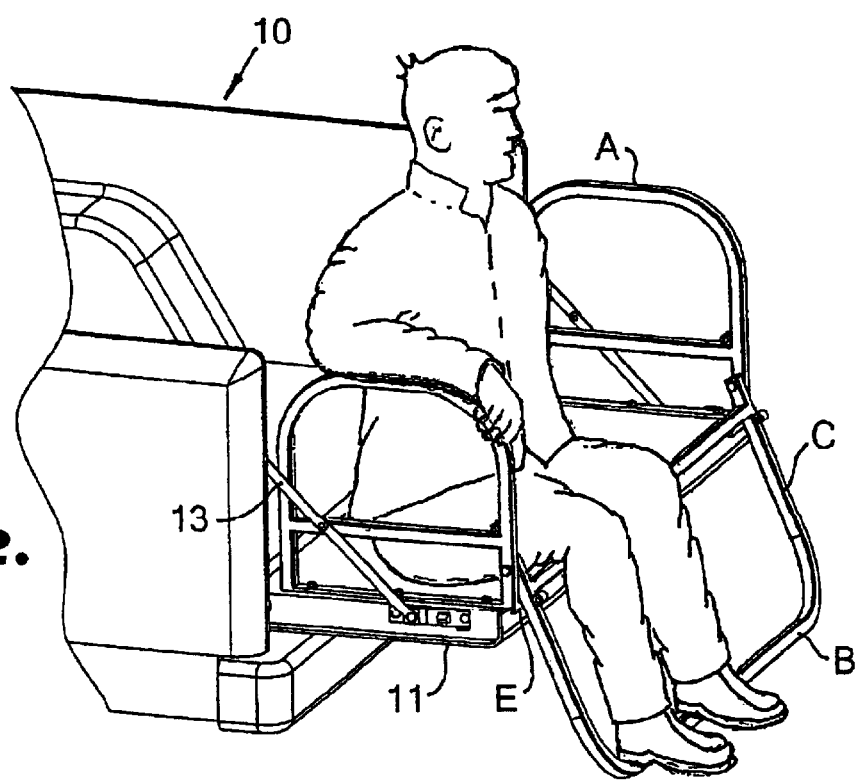
FIG. 12 is a perspective view of the embodiment shown in FIG. 4 illustrating the transverse member in the second position to accommodate the feet of a user.

When in a depending position, the transverse member B serves as an aid in accessing a truck as illustrated in FIG. 10 and for supporting the foot and lower legs of a user for comfortable seating on the tailgate 11 of the truck 10. It has been found the that a suitable angle for maximum comfort by many adults is approximately 60° more or less with the horizontal angle being dictated by comfort of the user. FIG. 11 illustrates a user placing a foot on the transverse member B while utilizing the handles for coming to a seated position as shown in FIG. 12 or as an aid in exiting from the tailgate 11. FIGS. 7 and 8 illustrate a mode of using the transverse member B as a bed extension for carrying elongated members including pipe sections and the like.

Figure 9:
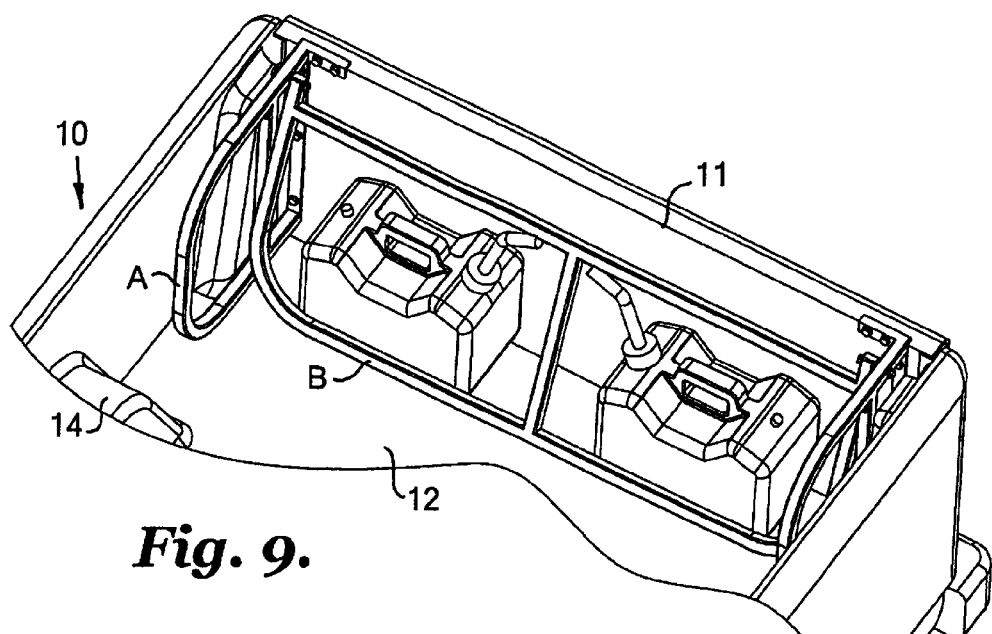
FIG. 9 is a perspective view of the embodiment shown in FIG. 2.

FIG. 9 illustrates the use of a transverse member B for portioning articles within the pickup truck 10 as illustrated by the gas cans shown in FIG. 9.

While a preferred embodiment of the invention has been described using specific terms, such description is for illustrative purposes only, and it is to be understood that changes and variations may be made to achieve additional uses as well as to utilize various construction material and configurations without departing from the spirit or scope of the following claims.

What is claimed is:

1. An apparatus for accessing and extending a truck bed having a tailgate, comprising:
   a. a pair of opposed end frame members attached to the tailgate;
   b. a transverse member pivotally connected to said opposed end frame members, said transverse member comprising a horizontal frame member with a leg extending from each end of said horizontal frame member;
   c. wherein said transverse member has a first position for retaining articles in the truck bed and a second position for providing a step into the truck bed.

2. The apparatus as in claim 1, wherein said opposed end frame members comprise U-shaped tubular members.

3. The apparatus of claim 1, further including a fastening member on each opposed end frame member for holding said transverse member in said first position.

4. The apparatus of claim 1, wherein said opposed end frame members include a bracket for attaching said opposed end frame members to the tailgate.

5. The apparatus of claim 1, further including a stop member attached to said opposed end frame members for limiting downward movement of said transverse member in said second position.

6. The apparatus of claim 1, wherein said transverse member further includes a support member attached to each leg of said horizontal frame member.

7. The apparatus of claim 6, wherein said transverse member further includes a center support attached to said horizontal frame member and said support member.

8. The apparatus of claim 1, wherein said transverse member is substantially horizontal in said first position.

9. The apparatus of claim 1, wherein said transverse member depends at an angle of about 60° to the horizontal in said second position.

10. An apparatus for a truck bed having a tailgate, comprising:
    a. a pair of opposed end frame members attached to the tailgate;
    b. a transverse member pivotally connected to said opposed end frame members, said transverse member comprising a horizontal frame member with a leg extending from each end of said horizontal frame member;
    c. wherein said transverse member has a first position for retaining articles in the truck bed.

11. The apparatus of claim 10, wherein said transverse member has a second position for providing a step into the truck bed.

12. The apparatus of claim 11, further including a stop member attached to said opposed end frame members for limiting downward movement of said transverse member in said second position.

13. The apparatus as in claim 10, wherein said opposed end frame members comprise U-shaped tubular members.

14. The apparatus of claim 10, further including a fastening member on each opposed end frame member for holding said transverse member in said first position.

15. The apparatus of claim 10, wherein said opposed end frame members include a bracket for attaching said opposed end frame members to the tailgate.

16. The apparatus of claim 10, wherein said transverse member further includes a support member attached to each leg of said horizontal frame member.

17. The apparatus of claim 16, wherein said transverse member further includes a center support attached to said horizontal frame member and said support member.

18. The apparatus of claim 10, wherein said transverse member is substantially horizontal in said first position.

19. The apparatus of claim 10, wherein said transverse member depends at an angle of about 60° to the horizontal in said second position.

20. A method for extending a pick-up bed having a tailgate, comprising:
- a. attaching a pair of opposed end frame members to opposite sides of the tailgate, wherein each of said opposed end frame members includes a fastening member;
- b. pivotally attaching a transverse member to each of said opposed end frame members, wherein said transverse member includes a horizontal frame member with a leg extending from each end of said horizontal frame member;
- c. lowering the tailgate:
- d. pivoting said transverse member to align said transverse member with said fastening member; and
- e. fastening said transverse member to said opposed end frame members at said fastening member.

* * * * *